United States Patent
Mohammadnezhad et al.

(10) Patent No.: US 11,968,073 B2
(45) Date of Patent: Apr. 23, 2024

(54) QUADRATURE PHASE SHIFT KEYING QUADRATURE AMPLITUDE MODULATION TRANSMITTER

(71) Applicant: The Regents of the University of California, Oakland, CA (US)

(72) Inventors: Hossein Mohammadnezhad, Irvine, CA (US); Huan Wang, Irvine, CA (US); Payam Heydari, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 171 days.

(21) Appl. No.: 17/597,261

(22) PCT Filed: Jun. 17, 2020

(86) PCT No.: PCT/US2020/038073
§ 371 (c)(1),
(2) Date: Dec. 30, 2021

(87) PCT Pub. No.: WO2021/003019
PCT Pub. Date: Jan. 7, 2021

(65) Prior Publication Data
US 2022/0321393 A1    Oct. 6, 2022

Related U.S. Application Data
(60) Provisional application No. 62/870,189, filed on Jul. 3, 2019.

(51) Int. Cl.
H04L 27/36 (2006.01)
(52) U.S. Cl.
CPC ................. *H04L 27/361* (2013.01)

(58) Field of Classification Search
CPC ..................... H04L 27/362; H04L 27/361
See application file for complete search history.

(56) References Cited

U.S. PATENT DOCUMENTS

| | | | |
|---|---|---|---|
| 5,237,292 A * | 8/1993 | Chethik | H04L 27/368 375/261 |
| 5,381,449 A * | 1/1995 | Jasper | H04L 25/0226 375/298 |
| 5,612,651 A | 3/1997 | Chethik | |
| 2004/0131129 A1 | 7/2004 | Harron et al. | |
| 2006/0022765 A1 | 2/2006 | Farag | |
| 2009/0158114 A1 | 6/2009 | Shokrollahi | |
| 2010/0202785 A1 | 8/2010 | Kawanishi et al. | |
| 2014/0035693 A1 * | 2/2014 | Li | H04L 27/32 332/103 |
| 2016/0013855 A1 | 1/2016 | Campos et al. | |
| 2018/0053984 A1 * | 2/2018 | Goto | H01P 5/10 |

OTHER PUBLICATIONS

International Search Report and Written Opinion, PCT/US2020/038073, dated Sep. 9, 2020 (20 pages).

* cited by examiner

*Primary Examiner* — Rahel Guarino
(74) *Attorney, Agent, or Firm* — Thomas Horstemeyer, LLP

(57) ABSTRACT

Aspects of quadrature phase shift keying for quadrature amplitude modulation are described. In some examples, quadrature phase shift keying signals are generated using quadrature phase shift keying modulators. The quadrature phase shift keying signals are combined in a combiner circuit to generate a quadrature amplitude modulation signal for wireless transmission.

20 Claims, 4 Drawing Sheets

QUADRATURE PHASE SHIFT KEYING QUADRATURE AMPLITUDE MODULATION TRANSMITTER

CROSS-REFERENCE TO RELATED APPLICATIONS

This application is a U.S. National Stage Application and claims priority to, and the benefit of, International Patent Application PCT/US2020/038073, filed on Jul. 17, 2020, and entitled "QUADRATURE PHASE SHIFT KEYING QUADRATURE AMPLITUDE MODULATION TRANSMITTER" and U.S. Provisional Application No. 62/870,189, filed on Jul. 3, 2019, and entitled "QUADRATURE PHASE SHIFT KEYING QUADRATURE AMPLITUDE MODULATION TRANSMITTER," the entire contents of which both are hereby incorporated herein by reference.

STATEMENT REGARDING FEDERALLY SPONSORED RESEARCH OR DEVELOPMENT

This invention was made with Government support under Grant No. ECCS1611575, awarded by the National Science Foundation (NSF). The Government has certain rights in the invention.

BACKGROUND

Fully integrated low-cost ultra high-speed wireless transmitters (TXs) and receivers (RXs) are of great importance in the deployment of applications such as 6G cellular networks. Current solutions that involve complex modulations (e.g., 16QAM and above) can require high-speed digital-to-analog converters (DACs) with 8-bit resolution or more. Some architectures are based on wideband intermediate frequency (IF) up-conversion where the modulated IF signal is quadrature up-converted and amplified before antenna interface. However, expensive high-speed and power-hungry arbitrary waveform generators (AWGs) are needed to generate high-quality wideband IF signals. Implementation of the AWG functionality on a chip is extremely challenging, rendering the approach impractical for a fully integrated system. Alternatively, a radio frequency (RF)-DAC architecture suffers from limited data-rate due to non-linearity-induced error vector magnitude (EVM) degradation at high baud-rates. In short, the need for high-speed high-resolution DACs in conventional architectures poses a critical bottleneck for high-speed wireless TXs.

BRIEF DESCRIPTION OF THE DRAWINGS

Aspects of the present disclosure can be better understood with reference to the following drawings. It is noted that the elements in the drawings are not necessarily to scale, with emphasis instead being placed on clearly illustrating the principles of the embodiments. In the drawings, like reference numerals designate like or corresponding, but not necessarily the same, elements throughout the several views.

SUMMARY

Figure 1:
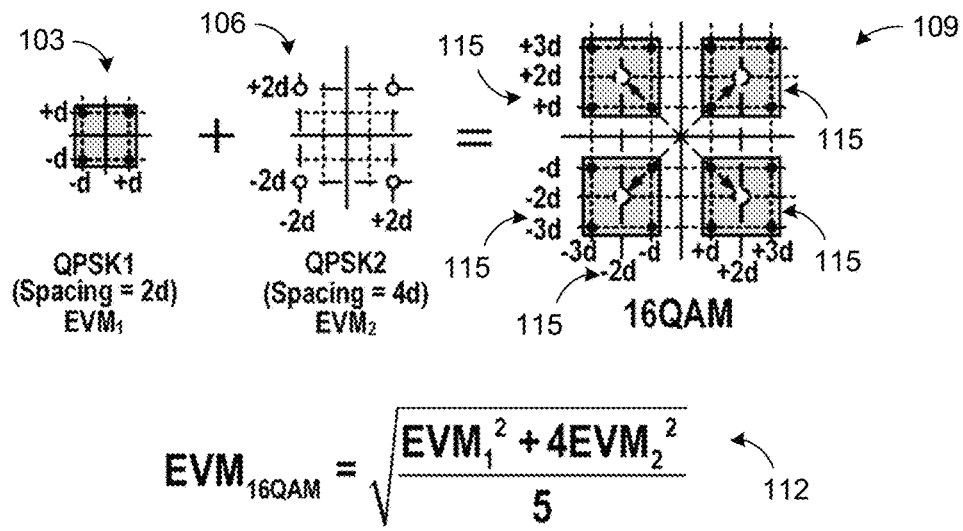
FIG. 1 illustrates an example of how quadrature phase shift keying (QPSK) constellations can be combined into a quadrature amplitude modulation (QAM) constellation according to various embodiments described herein.

The present disclosure relates to quadrature phase shift keying for quadrature amplitude modulation. Some existing techniques can require expensive, high-speed, power-hungry components and can be impractical for a fully integrated system. Other techniques suffer from limited data rates. However, the present disclosure enables a fully integrated bits-to-RF transmitter (TX) architecture, which realizes high speed 16QAM (and other $4^N$-QAM) constellations using a 1-bit resolution digital-to-analog (D/A) interface. This can avert high-speed high-resolution digital-to-analog converter (DAC) design challenges with a simplified design that provides significant improvements over conventional approaches.

Some aspects include a transmitter that can include a first quadrature phase shift keying (QPSK) modulator that generates a first QPSK signal based on a first bit pattern and a second bit pattern. A second QPSK modulator can output a second QPSK signal based on a third bit pattern and a fourth bit pattern, wherein an amplitude ratio between the first QPSK signal and the second QPSK signal is two. A combiner circuit can generate a quadrature amplitude modulation (QAM) signal based on the first QPSK signal and the second QPSK signal. The transmitter can wirelessly transmit the QAM signal.

Further aspects describe a method that can include generating quadrature phase shift keying (QPSK) signals using a number of QPSK modulators, combining the QPSK signals to generate a quadrature amplitude modulation (QAM) signal in a combiner circuit, and transmitting the QAM signal.

Additional aspects describe an integrated circuit that can include multiple quadrature phase shift keying (QPSK) modulators. A first one of the QPSK modulators generates a first QPSK signal, and a second one of the QPSK modulators generates a second QPSK signal. A combiner circuit can generate a quadrature amplitude modulation (QAM) signal that can be transmitted by a transmitter. The QAM signal can be generated based on the first QPSK signal and the second QPSK signal.

DETAILED DESCRIPTION

The present disclosure relates to using quadrature phase shift keying for quadrature amplitude modulation. As indicated above, some techniques can require expensive, high-speed, power-hungry components and can be impractical for a fully integrated system. Other techniques suffer from limited data rates. However, the present disclosure enables a fully integrated bits-to-RF transmitter (TX) architecture, which realizes high speed 16QAM (and other $4^N$-QAM) constellations using a 1-bit resolution digital-to-analog (D/A) interface. This can avert high-speed high-resolution digital-to-analog converter (DAC) design challenges with a simplified design that provides significant improvements over conventional approaches.

Embodiments of the present disclosure can include a millimeter (mm)-wave wireless transmitter that can take raw data bits as input and generate 16QAM constellation by combining two quadrature phase shift keying (QPSK) constellations with an amplitude ratio of 2. Higher-order $4^N$-QAM constellation can be formed by combining N QPSK constellations with a common amplitude ratio of 2. In other words, each additional QPSK constellation can have twice the amplitude of the next-highest amplitude QPSK constellation. For example, a first QPSK constellation can have an amplitude of X, a second QPSK constellation can have an amplitude of 2*(X), a third QPSK constellation can have an amplitude of 2*(2*(X)), and so on.

FIG. 1 illustrates an example of how QPSK constellations 103 and 106 can be combined into a quadrature amplitude modulation (QAM) constellation 109. The figure also shows an equation 112 to calculate the error vector magnitude (EVM) of the 16QAM constellation 109, $EVM_{16QAM}$. As shown in equation 112, $EVM_{16QAM}$ can be calculated using $EVM_1$ of the QPSK1 constellation 103 and the $EVM_2$ of QPSK2 constellation 106.

As shown in FIG. 1, the 16QAM constellation 109 can be decomposed into 4 QPSK sub-constellations 115 in 4 in-phase vs. quadrature (IQ) quadrants. The respective origins of these 4 QPSK sub-constellations 115 form another QPSK constellation with twice the amplitude. Specifically, the 16QAM constellation 109 can be a linear vectorial addition or combination of QPSK1 constellation 103 and QPSK2 constellation 106.

Therefore, a 16QAM constellation can be viewed as a linear vectorial addition of two QPSK constellations with an amplitude ratio of 2. This means a $4^2$-QAM constellation is a linear vectorial addition of 2 QPSK constellations. As can be understood, a 64QAM constellation can be viewed as four 16QAM quadrants. The origins of each 16QAM quadrant can be another QPSK constellation with four times the amplitude of the first QPSK constellation, and twice the amplitude of the second. Thus, a 64QAM ($4^3$-QAM) constellation can be a linear vectorial addition of three QPSK constellations. In this manner, higher-order $4^N$-QAM constellations can be formed by combining "N" QPSK constellations with a common amplitude ratio of 2.

For a case where QPSK1 and QPSK2 have equal EVMs and the error vectors are independent random processes, the combined 16QAM EVM will be the same as that of the QPSK. This unique feature can provide a significant advantage over conventional DAC-based TXs or RF-DACs since low-EVM high-speed QPSK constellation is more readily generated and can be realized using raw bits of input without linearity concern.

Figure 2A:
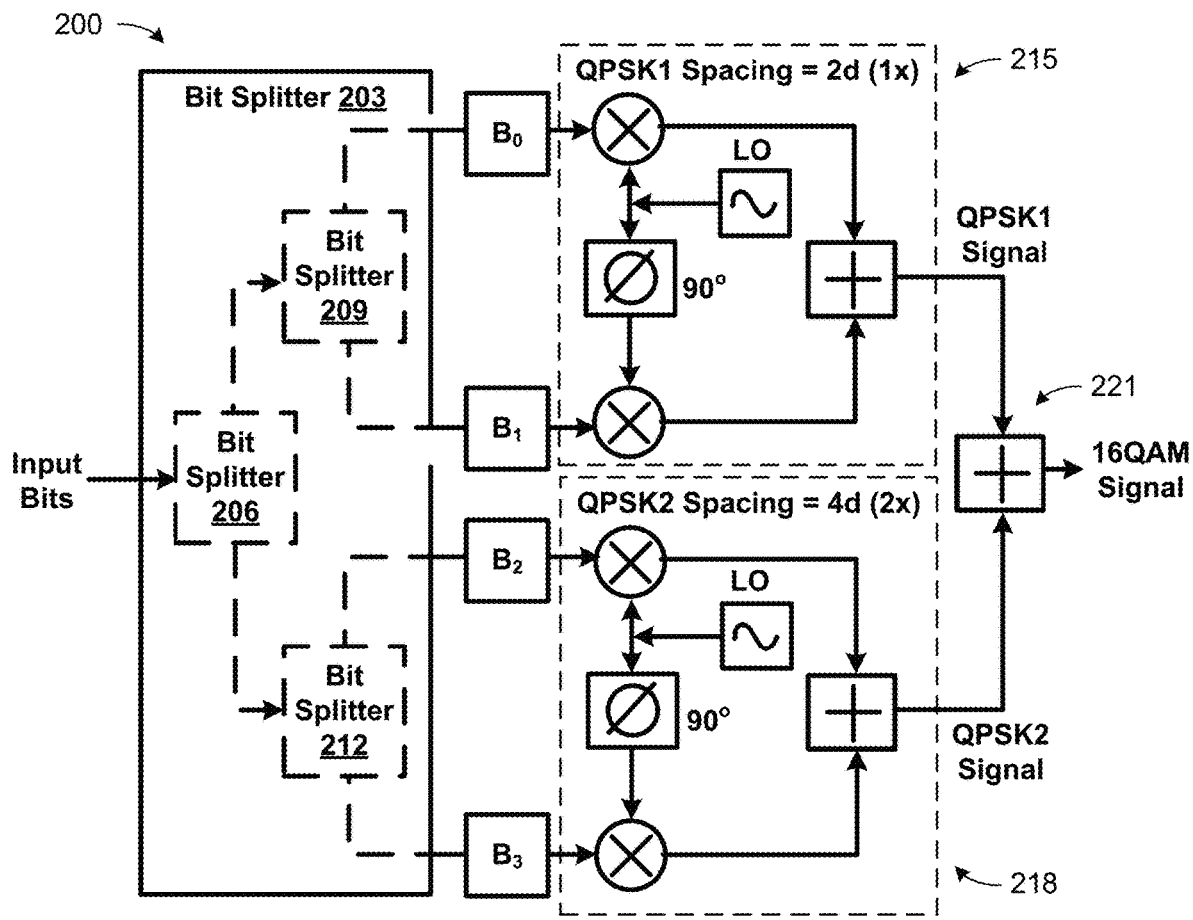
FIG. 2A illustrates an example block diagram of a circuit that converts bits to a 16QAM signal according to various embodiments described herein.

FIG. 2A illustrates an example block diagram of a circuit 200 that can convert input bits to a 16QAM signal. The circuit 200 can include a transmitter circuit and can be part of a wireless transmitter. The input bits, including a binary data stream, a binary file, or a set of binary bits representing a data structure, can be input into the circuit 200. The input bits can be split into $B_0$, $B_1$, $B_2$, and $B_3$, which can represent four parallel bits, bitstreams, sets of binary bits, or another bit pattern. The input bits can be binary bits generated based on a file or any data structure. The input bits can be separated into multiple bit patterns using any method, for input into the QPSK modulators.

In some examples, a bit splitter 203 can be utilized in order to split the input bits into bit patterns $B_0$, $B_1$, $B_2$, and $B_3$. The bit splitter 203 can separate the bits using any appropriate circuit. In some cases, the bit splitter 203 can include a first level bit splitter 206 that separates the input bits, for example, routing odd bits received at the first level bit splitter 206 to a second level bit splitter 209 (or 212) and even bits to a second level bit splitter 212 (or 209). The second level bit splitter 209 can separate the bits it receives into the bits $B_0$ and $B_1$, for example, according to odd and even bits as received. The second level bit splitter 212 can separate the bits it receives into the bits $B_2$ and $B_3$. While the preceding example describes separating bits according to odd and even bits, other methods can also be used. For example, the bit splitter 203 can divide a set of input bits of length M into four approximately equal quarters with a length of approximately M/4 and possibly rounding up to the nearest number divisible by four. A first quarter of the input bits can include the first M/4 bits, the second quarter can include the second M/4 bits, and so on.

The bits $B_0$ and $B_1$ can be input into QPSK1 modulator 215. The bits $B_0$ can be input into a first mixer or multiplier of the QPSK1 modulator 215, while the bits $B_1$ can be input into a second mixer of the QPSK1 modulator 215. The first mixer can multiply the bits $B_0$ with a carrier signal from a local oscillator. The second mixer multiplies the bits $B_1$ with a phase shifted version of the carrier signal from the local oscillator, for example, phase shifted by 90 degrees. The output from the first mixer can be an in-phase phase shift keying $PSK_I$ signal, which is in-phase with the carrier signal. The output from the second mixer can be a quadrature phase shift keying $PSK_Q$ signal that is out of phase 90 degrees from the carrier signal. These outputs from the respective mixers can be inputs to an adder, summer, or combiner of the QPSK1 modulator 215. The signal resulting from the adder can be a QPSK1 signal output. This can have a particular amplitude, and the QPSK2 modulator 218 can have a QPSK2 signal output that is twice the amplitude of the QPSK1 signal output.

The bits $B_2$ and $B_3$ can be input into QPSK2 modulator 218. The bits $B_2$ can be input into a first mixer or multiplier of the QPSK2 modulator 218, while the bits $B_3$ can be input into a second mixer of the QPSK2 modulator 218. The first mixer can multiply the bits $B_2$ with the carrier signal from the local oscillator. The second mixer multiplies the bits $B_3$ with the phase shifted version of the carrier signal. The output from the first mixer can be an in-phase phase shift keying $PSK_I$ signal, and the output from the second mixer can be a quadrature phase shift keying $PSK_Q$ signal. These outputs can be inputs to an adder, summer or combiner of the QPSK2 modulator 218. The signal resulting from the adder can be a QPSK2 signal output.

A ratio of the amplitude of the QPSK2 signal to the amplitude of the QPSK1 signal can be two (2:1). In some cases, this can be achieved by a current source for the QPSK2 modulator 218 that is twice the amplitude of a current source for the QPSK1 modulator 215. In other cases, the currents can be equal but the voltage sources can have an amplitude ratio of 2. In any case, the QPSK1 signal and the QPSK2 signal can have an amplitude ratio of 2.

The QPSK1 Signal and the QPSK2 signal can be combined in an adder, summer or combiner 221 of the transmitter circuit 200. The result of combining the QPSK1 signal and the QPSK2 signal can be a 16QAM signal that can be wirelessly transmitted by a transmitter that includes the transmitter circuit 200.

Figure 2B:
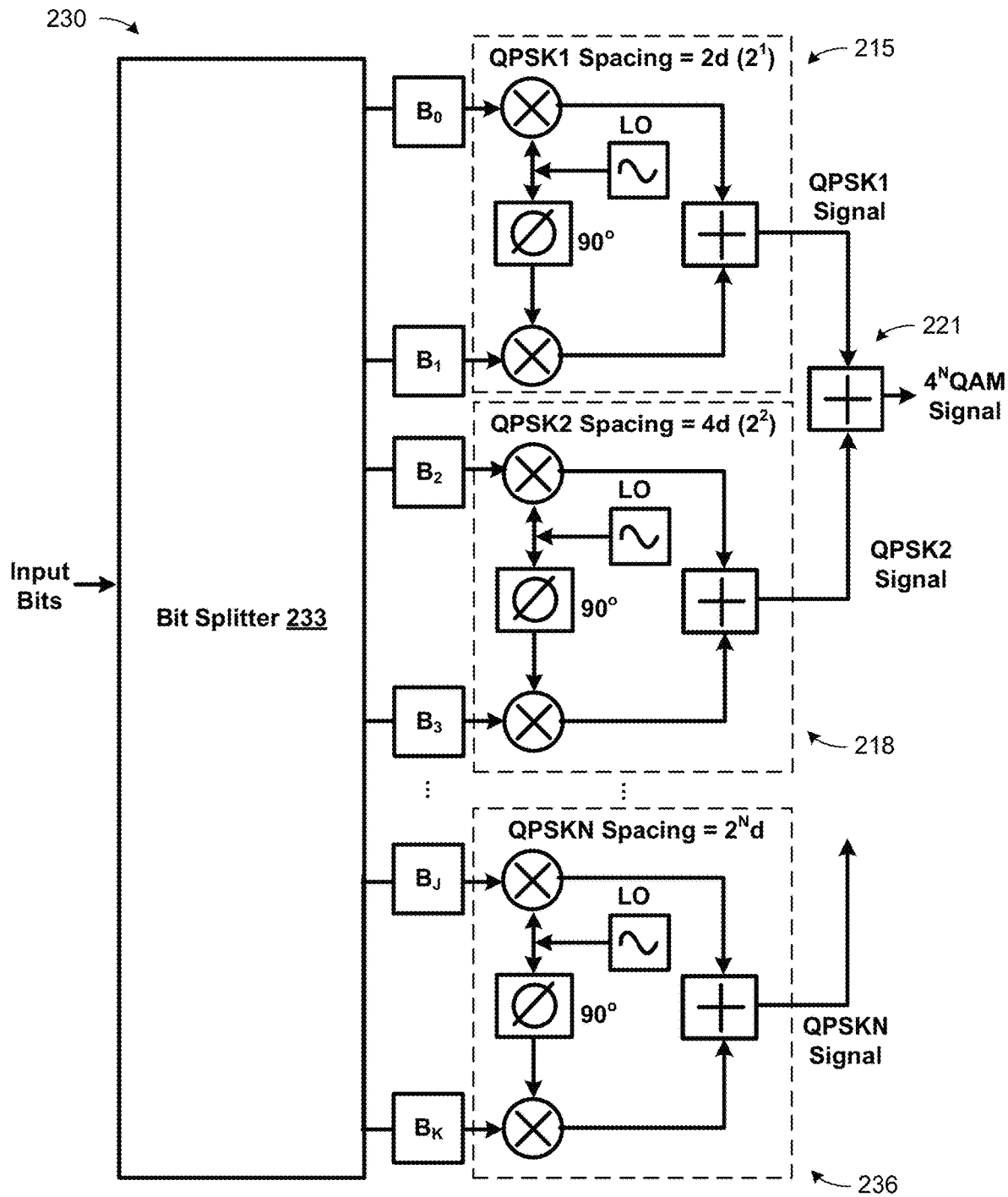
FIG. 2B illustrates an example block diagram of a circuit that converts bits to a $4^N$QAM signal according to various embodiments described herein.

FIG. 2B illustrates an example block diagram of a circuit 230 that can convert input bits to a $4^N$QAM signal. FIG. 2B shows how the concepts described with respect to FIG. 2A can be expanded to generate any $4^N$QAM signal with any number of QPSK modulators.

The circuit 230 can include a transmitter circuit and can be part of a wireless transmitter. The input bits, including a binary data stream, a binary file, or a set of binary bits representing a data structure, can be input into the circuit 230. The input bits can be split into $B_0$, $B_1$, $B_2$, $B_3$ ... $B_J$, and $B_K$ which can represent "K" parallel bits, bitstreams, sets of binary bits, or another bit pattern. The input bits can be binary bits generated based on a file or any data structure. The input bits can be separated into multiple bit patterns using any method, for input into the QPSK modulators.

In some examples, a bit splitter 233 can be utilized in order to split the input bits into bit patterns $B_0$, $B_1$, $B_2$, $B_3$ ... $B_J$, and $B_K$. The bit splitter 233 can separate the bits using any appropriate circuit or method. For example, the bit splitter 233 can divide a set of input bits of length M into K approximately equal quarters with a length of approximately M/K and possibly rounding up to the nearest number divisible by K. A first quarter of the input bits can include the first M/K bits, the second quarter can include the second M/K bits, and so on.

The bits $B_0$ and $B_1$ can be input into QPSK1 modulator 215. The bits $B_0$ can be input into a first mixer or multiplier of the QPSK1 modulator 215, while the bits $B_1$ can be input into a second mixer of the QPSK1 modulator 215. The first mixer can multiply the bits $B_0$ with a carrier signal from a local oscillator. The second mixer multiplies the bits $B_1$ with a phase shifted version of the carrier signal from the local oscillator, for example, phase shifted by 90 degrees. The output from the first mixer can be an in-phase phase shift keying $PSK_I$ signal, which is in-phase with the carrier signal. The output from the second mixer can be a quadrature phase shift keying $PSK_Q$ signal that is out of phase 90 degrees from the carrier signal. These outputs from the respective mixers can be inputs to an adder, summer, or combiner of the QPSK1 modulator 215. The signal resulting from the adder can be a QPSK1 signal output. This can have a particular amplitude, and the QPSK2 modulator 218 can have a QPSK2 signal output that is twice the amplitude of the QPSK1 signal output.

The bits $B_2$ and $B_3$ can be input into QPSK2 modulator 218. The bits $B_2$ can be input into a first mixer or multiplier of the QPSK2 modulator 218, while the bits $B_3$ can be input into a second mixer of the QPSK2 modulator 218. The first mixer can multiply the bits $B_2$ with the carrier signal from the local oscillator. The second mixer multiplies the bits $B_3$ with the phase shifted version of the carrier signal. The output from the first mixer can be an in-phase phase shift keying $PSK_I$ signal, and the output from the second mixer can be a quadrature phase shift keying $PSK_Q$ signal. These outputs can be inputs to an adder, summer or combiner of the QPSK2 modulator 218. The signal resulting from the adder can be a QPSK2 signal output.

The bits $B_J$ and $B_K$ can be input into the QPSKN modulator 236. The bits $B_J$ can be input into a first mixer or multiplier of the QPSKN modulator 236, while the bits $B_K$ can be input into a second mixer of the QPSKN modulator 236. The first mixer can multiply the bits $B_J$ with the carrier signal from the local oscillator. The second mixer multiplies the bits $B_K$ with the phase shifted version of the carrier signal. The output from the first mixer can be an in-phase phase shift keying $PSK_I$ signal, and the output from the second mixer can be a quadrature phase shift keying $PSK_Q$ signal. These outputs can be inputs to an adder, summer or combiner of the QPSKN modulator 236. The signal resulting from the adder can be a QPSKN signal output. This circuit is understood to be expandable to include any number of QPSK modulators.

A ratio of the amplitude of the QPSK2 signal to the amplitude of the QPSK1 signal can be two (2:1). The ratio of the amplitude can be increased by two for each subsequent QPSK modulator. For example, if there are three total QPSK modulators, then the ratio between the QPSKN signal and the QPSK2 signal can be two. In any case, each subsequent QPSK modulator can have a ratio of two with respect to a previous modulator.

In some cases, amplitude differences can be achieved by a current source for each subsequent QPSK modulator being twice the amplitude of a current source for the previous QPSK modulator. In other cases, the currents can be equal, but the voltage sources can have an amplitude ratio of 2.

All of the QPSK signals can be combined using one or more adder, summer or combiner 221 of the transmitter circuit 230. The result of combining the QPSK signals can be a $4^N$QAM signal that can be wirelessly transmitted by a transmitter that includes the circuit 230.

Figure 3:
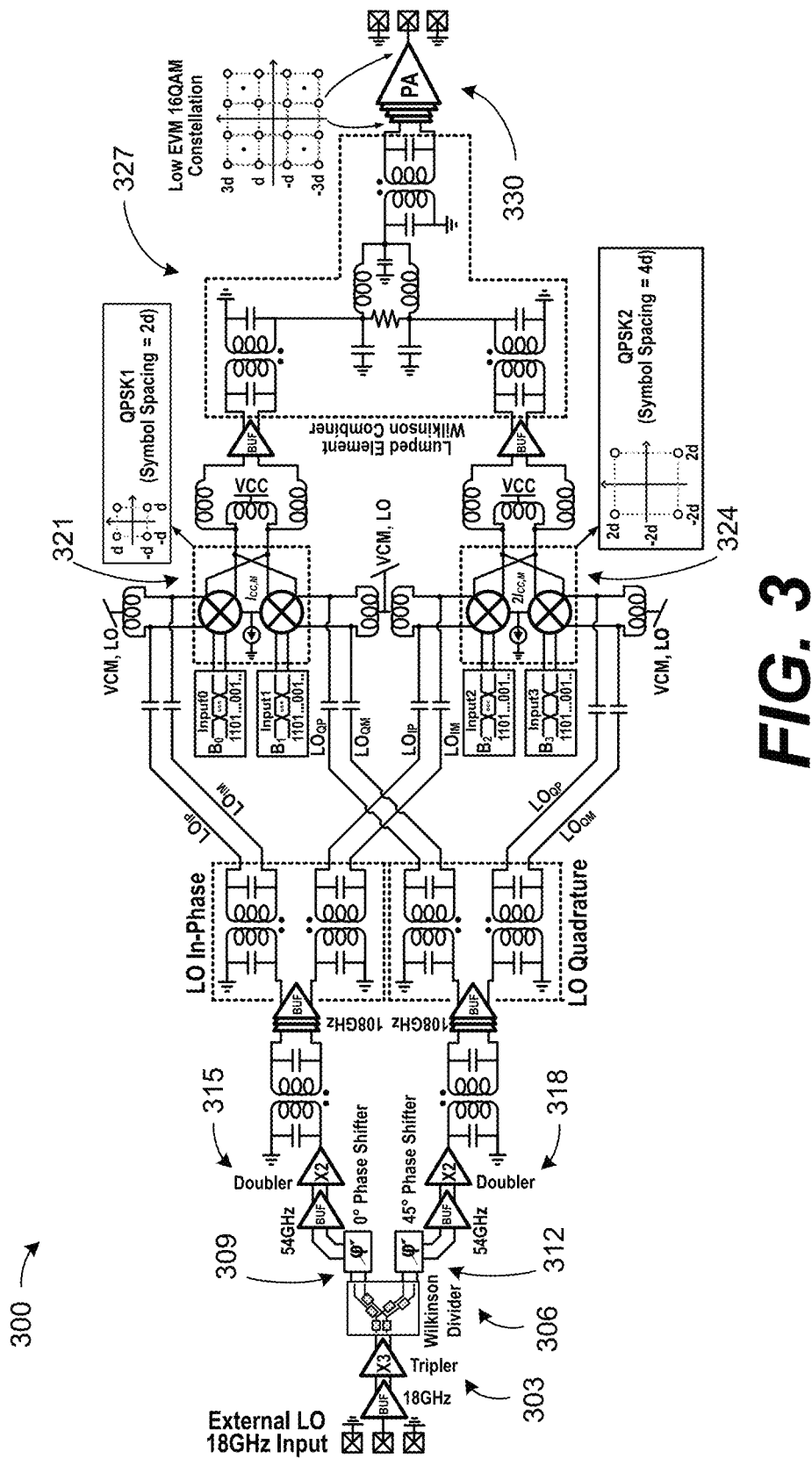
FIG. 3 illustrates an example of a circuit that converts bits to a 16QAM signal according to various embodiments described herein.

FIG. 3 illustrates an example of a circuit diagram of a circuit 300 that converts bits to a 16QAM signal. The circuit 300 provides a specific example of quadrature phase shift keying for a quadrature amplitude modulation transmitter circuit. An external 18 GHz local oscillator (LO) signal can be first tripled in a tripler 303, and fed into a Wilkinson power divider 306. Two all-pass phase shifters 309 and 312 can cause a tunable 45° difference between the split LO signals. The LO signals can be doubled in the doublers 315 and 318 to produce a LO in-phase signal and a LO quadrature LO signal at a desired center frequency, which can be 110 GHz or another frequency. These can be used as inputs to each of the QPSK1 modulator 321 and QPSK2 modulator 324, along with bit patterns $B_0$, $B_1$, $B_2$, and $B_3$. As shown, $B_0$ and $B_2$ are mixed with the in-phase signal, while $B_1$ and $B_3$ are mixed with the quadrature signal. However, the amplitudes output from the QPSK1 modulator 321 and the QPSK2 modulator 324 can be different. As shown, this difference can involve $I_{CCM}$ being used for QPSK1 modulator 321, while $2I_{CCM}$ can be utilized for the QPSK2 modulator 324.

The bit patterns $B_0$, $B_1$, $B_2$, and $B_3$ can drive the QPSK modulator QPSK1 and QPSK2 to form independent QPSK constellations with different amplitudes. Accordingly, the symbol spacing of QPSK1 signal can be 2d, while the symbol spacing of the QPSK2 signal can be 4d. The two QPSK signals can be combined in a combiner, such as a lumped-element Wilkinson combiner 327 or any combiner circuit.

In some examples, signals from QPSK modulators can be differential signals. These differential signals from the QPSK modulators can be converted to single-ended signals to avoid signal cross-overs in differential power combining. The combined signal can then be converted back to differential to feed the power amplifier (PA) 330. Buffer stages can be inserted between QPSK modulators and the power combiner to compensate for losses associated with power combining.

Figure 4:
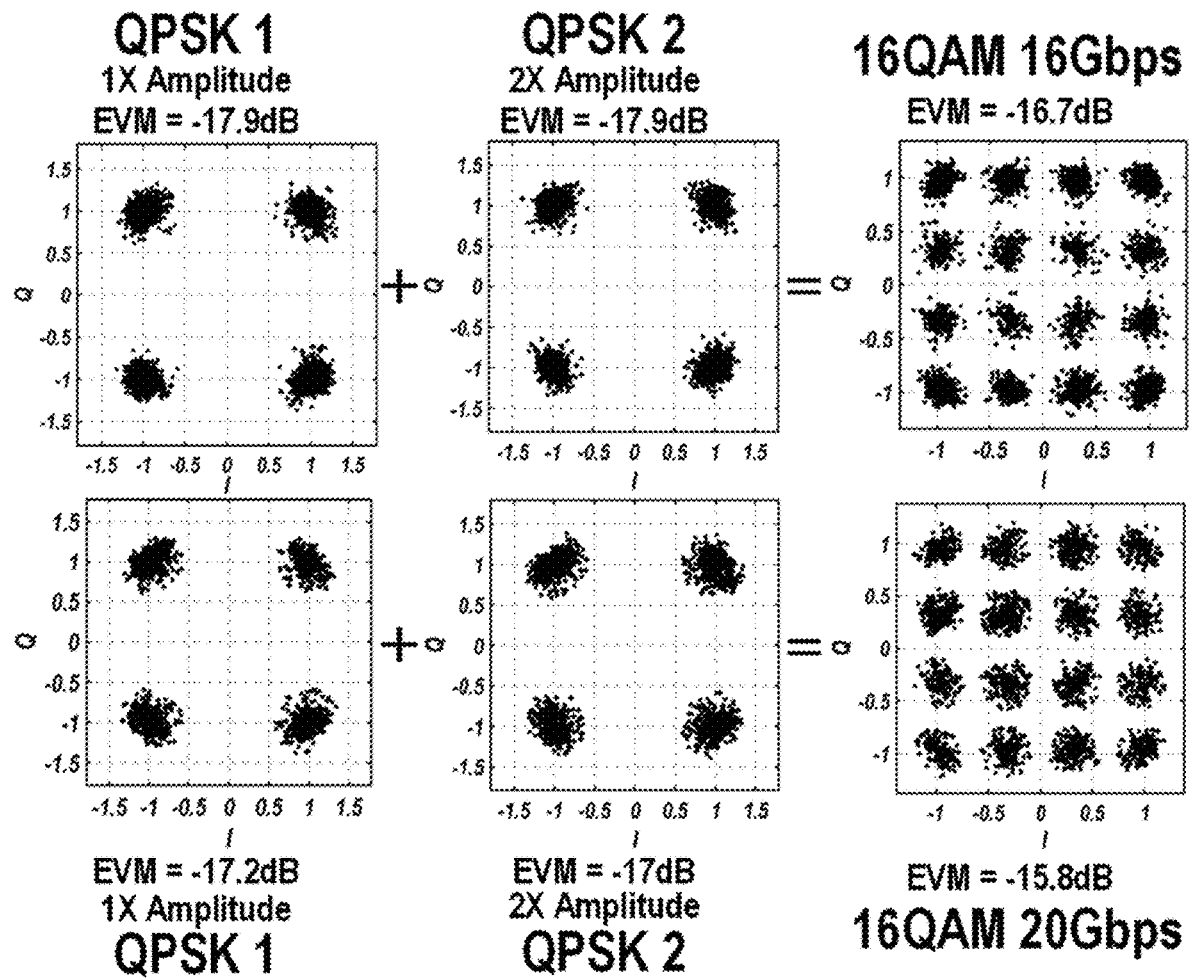
FIG. 4 illustrates examples of measured QPSK and 16QAM constellation diagrams according to various embodiments described herein.

FIG. 4 illustrates examples of measured QPSK and 16QAM constellation diagrams according to various embodiments described herein. This example can represent results of a transmitter that can deliver approximately 3 dBm maximum continuous wave (CW) output power with wireless tests at a distance of 20 cm that can result in 16 Gbps and 20 Gbps measured data-rates. An error vector magnitude (EVM) of the 16QAM signal can be −16.7 dB and −15.8 dB, respectively, corresponding to a bit error rate (BER) of $10^{-3}$.

Embodiments of the present disclosure can be described with reference to the following clauses. It is understood that the aspects described in a clause can be combined with aspects described in any one of the other clauses and any combination of the other clauses.

Clause 1 describes a transmitter, comprising: a first quadrature phase shift keying (QPSK) modulator that generates a first QPSK signal based on a first bit pattern and a second bit pattern; a second QPSK modulator that outputs a second QPSK signal based on a third bit pattern and a fourth bit pattern, wherein an amplitude ratio between the first QPSK signal and the second QPSK signal is two; and a combiner circuit that generates a quadrature amplitude modulation (QAM) signal based on the first QPSK signal and the second QPSK signal, wherein the transmitter wirelessly transmits the QAM signal.

Clause 2 describes the transmitter of clause 1, wherein the QAM signal is a 16 QAM signal.

Clause 3 describes the transmitter of any one of clauses 1 to 2, further comprising: a third QPSK modulator that outputs a third QPSK signal based on a fifth bit pattern and a sixth bit pattern, wherein an amplitude ratio between the second QPSK signal and the third QPSK signal is two, and wherein the QAM signal is a 64 QAM signal.

Clause 4 describes the transmitter of any one of clauses 1 to 3, further comprising: a bit splitter circuit that outputs the first bit pattern, the second bit pattern, the third bit pattern, and the fourth bit pattern, based on input bits.

Clause 5 describes the transmitter of any one of clauses 1 to 4, wherein the input bits are based on an input file.

Clause 6 describes the transmitter of any one of clauses 1 to 5, wherein the first QPSK modulator generates the first QPSK signal by summing the respective results of mixing the first bit pattern with a carrier signal based on the local oscillator circuit, and mixing the second bit pattern with a ninety degree phase shifted version of the carrier signal.

Clause 7 describes the transmitter of any one of clauses 1 to 6, wherein the second QPSK modulator generates the second QPSK signal by summing the respective results of mixing the third bit pattern with a carrier signal based on the local oscillator circuit, and mixing the fourth bit pattern with a ninety degree phase shifted version of the carrier signal.

Clause 8 describes the transmitter of any one of clauses 1 to 7, wherein the combiner circuit comprises a Wilkinson combiner.

Clause 9 describes a method, comprising: generating a plurality of quadrature phase shift keying (QPSK) signals using a corresponding plurality of QPSK modulators; combining, in a combiner circuit, the plurality of QPSK signals to generate a quadrature amplitude modulation (QAM) signal; and transmitting the QAM signal.

Clause 10 describes the method of clause 9, wherein the QAM signal is a $4^N$-QAM signal, and N is a number of the plurality of QPSK modulators.

Clause 11 describes the method of any one of clauses 9 to 10, wherein the combiner circuit comprises a Wilkinson combiner.

Clause 12 describes the method of any one of clauses 9 to 11, further comprising: amplifying the QAM signal using a power amplifier.

Clause 13 describes the method of any one of clauses 9 to 12, wherein an amplitude ratio between a first QPSK constellation of a first one of the plurality of QPSK signals and a second QPSK constellation of a second one of the plurality of QPSK signals is two.

Clause 14 describes the method of any one of clauses 9 to 13 further comprising: inputting a first bit pattern and a second bit pattern into a first one of the plurality of QPSK modulators to generate a first QPSK signal of the plurality of QPSK signals.

Clause 15 describes the method of any one of clauses 9 to 14, further comprising: inputting a third bit pattern and a fourth bit pattern into a second one of the plurality of QPSK modulators to generate a second QPSK signal of the plurality of QPSK signals.

Clause 16 describes an integrated circuit, comprising: a plurality of quadrature phase shift keying (QPSK) modulators, wherein a first one of the QPSK modulators generates a first QPSK signal, and a second one of the QPSK modulators generates a second QPSK signal; and a combiner circuit that generates a quadrature amplitude modulation (QAM) signal that is transmitted by a transmitter, the QAM signal being generated based on the first QPSK signal and the second QPSK signal.

Clause 17 describes the integrated circuit of clause 16, wherein the QAM signal is a 16QAM signal.

Clause 18 describes the integrated circuit of any one of clauses 16 to 17, wherein a third one of the QPSK modulators generates a third QPSK signal, and the QAM signal is a 64QAM signal generated based on the first QPSK signal, the second QPSK signal, and the third QAM signal.

Clause 19 describes the integrated circuit of any one of clauses 16 to 18, further comprising: a power amplifier that amplifies the QAM signal.

Clause 20 describes the integrated circuit of any one of clauses 16 to 19, wherein outputs from the QPSK modulators are differential signals, and the differential signals are converted to single-ended signals to avoid signal crossovers.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures. While the above-described embodiments of the present disclosure are described with respect to various figures, it is understood that the concepts described with respect to a particular figure can also be utilized along with and in combination with the concepts described in the additional figures. Many variations and modifications can be made to the above-described embodiments without departing substantially from the spirit and principles of the disclosure. All such modifications and variations are intended to be included within the scope of this disclosure.

Therefore, the following is claimed:
1. A transmitter, comprising:
  an integrated circuit that takes input bits as input and provides a quadrature amplitude modulation (QAM) signal as an output for transmission, the integrated circuit comprising:
  a first quadrature phase shift keying (QPSK) modulator that generates a first QPSK signal based on a first bit pattern and a second bit pattern;
  a second QPSK modulator that outputs a second QPSK signal based on a third bit pattern and a fourth bit pattern, wherein an amplitude ratio between the first QPSK signal and the second QPSK signal is two;

a combiner circuit component that generates the QAM signal based on the first QPSK signal and the second QPSK signal, wherein the transmitter wirelessly transmits the QAM signal; and a bit splitter that splits the input bits into a plurality of bit patterns comprising the first bit pattern, the second bit pattern, the third bit pattern, and the fourth bit pattern, wherein the bit splitter, the first QPSK modulator, and the second QPSK modulator are integrated components of the integrated circuit.

2. The transmitter of claim 1, wherein the QAM signal is a 16 QAM signal.

3. The transmitter of claim 1, further comprising:
a third QPSK modulator that outputs a third QPSK signal based on a fifth bit pattern and a sixth bit pattern, wherein an amplitude ratio between the second QPSK signal and the third QPSK signal is two, and wherein the QAM signal is a 64 QAM signal.

4. The transmitter of claim 1, further comprising: a bit splitter circuit that outputs the first bit pattern, the second bit pattern, the third bit pattern, and the fourth bit pattern, based on input bits.

5. The transmitter of claim 4, wherein the input bits are based on an input file.

6. The transmitter of claim 1, wherein the first QPSK modulator generates the first QPSK signal by summing respective results of mixing the first bit pattern with a carrier signal based on a local oscillator circuit, and mixing the second bit pattern with a ninety degree phase shifted version of the carrier signal.

7. The transmitter of claim 6, wherein the second QPSK modulator generates the second QPSK signal by summing the respective results of mixing the third bit pattern with the carrier signal based on the local oscillator circuit, and mixing the fourth bit pattern with the ninety degree phase shifted version of the carrier signal.

8. The transmitter of claim 1, wherein the combiner circuit component comprises a Wilkinson combiner.

9. A method, comprising:
generating a plurality of quadrature phase shift keying (QPSK) signals using a corresponding plurality of QPSK modulators, wherein outputs from the plurality of QPSK modulators are differential signals, and the differential signals are converted to single-ended signals to avoid signal cross-overs;
combining, in a combiner circuit, the plurality of QPSK signals to generate a quadrature amplitude modulation (QAM) signal; and
transmitting the QAM signal.

10. The method of claim 9, wherein the QAM signal is a $4^N$-QAM signal, and N is a number of the plurality of QPSK modulators.

11. The method of claim 10, wherein the combiner circuit comprises a Wilkinson combiner.

12. The method of claim 10, further comprising: amplifying the QAM signal using a power amplifier.

13. The method of claim 9, wherein an amplitude ratio between a first QPSK constellation of a first one of the plurality of QPSK signals and a second QPSK constellation of a second one of the plurality of QPSK signals is two.

14. The method of claim 9, further comprising:
inputting a first bit pattern and a second bit pattern into a first one of the plurality of QPSK modulators to generate a first QPSK signal of the plurality of QPSK signals.

15. The method of claim 14, further comprising:
inputting a third bit pattern and a fourth bit pattern into a second one of the plurality of QPSK modulators to generate a second QPSK signal of the plurality of QPSK signals.

16. An integrated circuit, comprising:
a plurality of quadrature phase shift keying (QPSK) modulators, wherein a first one of the QPSK modulators generates a first QPSK signal, and a second one of the QPSK modulators generates a second QPSK signal, wherein outputs from the QPSK modulators are differential signals, and the differential signals are converted to single-ended signals to avoid signal cross-overs; and a combiner circuit that generates a quadrature amplitude modulation (QAM) signal that is transmitted by a transmitter, the QAM signal being generated based on the first QPSK signal and the second QPSK signal.

17. The integrated circuit of claim 16, wherein the QAM signal is a 16QAM signal.

18. The integrated circuit of claim 16, wherein a third one of the QPSK modulators generates a third QPSK signal, and the QAM signal is a 64QAM signal generated based on the first QPSK signal, the second QPSK signal, and the third QPSK signal.

19. The integrated circuit of claim 16, further comprising: a power amplifier that amplifies the QAM signal.

20. The integrated circuit of claim 19, wherein-the QAM signal combined using the combiner circuit is converted into a differential QAM signal that is provided to the power amplifier.

* * * * *